United States Patent
Doi et al.

(10) Patent No.: US 9,866,370 B2
(45) Date of Patent: Jan. 9, 2018

(54) CONFIGURABLE ASIC-EMBEDDED CRYPTOGRAPHIC PROCESSING ENGINE

(75) Inventors: Bryan Doi, Queen Creek, AZ (US); Kevin Osugi, Gilbert, AZ (US); Nhu-Ha Yup, Phoenix, AZ (US); Richard Takahashi, Phoenix, AZ (US)

(73) Assignee: ITT MANUFACTURING ENTERPRISES, LLC, Wilmington, DE (US)

(*) Notice: Subject to any disclaimer, the term of this patent is extended or adjusted under 35 U.S.C. 154(b) by 1218 days.

(21) Appl. No.: 11/987,887

(22) Filed: Dec. 5, 2007

(65) Prior Publication Data
US 2009/0147945 A1      Jun. 11, 2009

(51) Int. Cl.
*H04L 9/00*       (2006.01)
*H04L 9/06*       (2006.01)

(52) U.S. Cl.
CPC ........... *H04L 9/002* (2013.01); *H04L 9/0625* (2013.01); *H04L 2209/127* (2013.01); *H04L 2209/26* (2013.01)

(58) Field of Classification Search
CPC ..... G06F 21/76; G06F 2217/64; G06F 17/505
USPC ................. 380/2; 726/34; 713/192, 194
See application file for complete search history.

(56) References Cited

U.S. PATENT DOCUMENTS

| | | | |
|---|---|---|---|
| 6,823,069 B1* | 11/2004 | Kitajima et al. | 380/44 |
| 7,237,262 B2 | 6/2007 | Lahti et al. | |
| 7,788,502 B1* | 8/2010 | Donlin et al. | 713/189 |
| 2001/0037458 A1 | 11/2001 | Kean | |
| 2002/0191790 A1 | 12/2002 | Anand et al. | |
| 2002/0199110 A1* | 12/2002 | Kean | G06F 17/5054 713/189 |
| 2005/0198404 A1* | 9/2005 | Kawakami et al. | 710/1 |
| 2006/0059369 A1 | 3/2006 | Fayad et al. | |
| 2006/0059574 A1 | 3/2006 | Fayad et al. | |

OTHER PUBLICATIONS

Menezes, Alfred J. et al., "Handbook of Applied Cryptography," CRC Press LLC, Boca Raton, FL, 1997 [17 pages].
Schneier, Bruce et al., "Unbalanced Feistel Networks and Block-Cipher Design," Counterpayne Systems, 101 East Minnehaha Parkway, Minneapolis, MN 55419 [24 pages].
International Search Report and Written Opinion dated Feb. 2, 2009 in PCT/US08/13464.
Preliminary Report on Patentability and Written Opinion dated Jun. 17, 2010 in PCT Appln. No. PCT/US2008/013464.

* cited by examiner

*Primary Examiner* — Ellen Tran
(74) *Attorney, Agent, or Firm* — Davidson Berquist Jackson & Gowdey, LLP (57) ABSTRACT

Architecture for embedding a cryptographic engine in a processor is disclosed. An ASIC processor is embedded with a programmable processing core, such as an FPGA, with the key register and I/O registers remaining in fixed logic.

23 Claims, 6 Drawing Sheets

Feistel Cipher

Figure 6 though this example design describes a Feistel Cipher. (Wikipedia: http://en.wikipedia.org/wiki/Feistel_cipher)

CONFIGURABLE ASIC-EMBEDDED CRYPTOGRAPHIC PROCESSING ENGINE

This relates to cryptography and more particularly to cryptographic processing engines embedded in semiconductor processors.

INTRODUCTION

Modern cryptographic devices contain a processor that exercises a cryptographic algorithm in combination with a private or public key(s). Most such products use a software programmable microprocessor, a customer application specific integrated circuit (ASIC), or a stand-alone field programmable gate array (FPGA) to perform the cryptographic algorithm. The microprocessor and FPGA options have the benefit of being reprogrammable. These devices load the algorithm into a programmable processing device to ensure that, as the field of data security progresses, the algorithm can be changed or updated by reprogramming the algorithm in the field.

The software programmable microprocessor is advantageous because it can easily be modified to support new cryptographic algorithms, but is difficult to secure from potential security attacks or assure it is fail safe in operation. Software implementations are very susceptible to reverse-engineering, making security qualification of software-based devices difficult to achieve.

Employing an ASIC instead of a software programmable microprocessor introduces a different set of issues. Upgrading an ASIC with a new algorithm requires that a new ASIC be developed, produced, and installed. That is costly and inconvenient.

The FPGA, on the other hand, can be updated in the field, which is less-costly and more convenient because it can be done in the existing hardware but is fraught with security hazard because the new programming image must be downloaded to the EEPROM used to load the FPGA on the product platform. Using industry standard FPGA devices to implement programmable algorithms in products runs the risk the FPGA being reverse-engineered and compromised. If the new algorithm is loaded using encryption plus a key, then the FPGA needs to know the key—and informing the FPGA of that key is an information transfer that can also compromise the encryption.

Another issue associated with the use of a stand-alone FPGA in a cryptographic algorithm function is the difficulty of implementing a fail safe design. The FPGA alone cannot assure a fail-safe design—the only way to assure such is to use external/ancillary logic/controls/functions and memories. That is, if the FPGA design is tampered with or altered, if a transistor fails inside the FPGA, of if an FPGA memory programming element is changed or fails, then the original FPGA design is altered. With external logic (external to the FPGA), the logic will detect the change and, once detected, will fail to a safe state. This is sometimes called an Assured Design, where the FPGA design functions as designed or programmed until a failure mode is detected by the external logic and the FPGA, external logic and other functions fail to a safe state and terminate operations without compromising the encryption.

Thus, when designing a qualifying cryptographic product, one currently chooses between (1) a fixed-logic processor (such as an ASIC) which has a highly secured algorithm but must inconveniently be removed and replaced with a redesigned fixed-logic processor for upgrades, (2) a programmable-logic processor (such as an FPGA) which is easily reprogrammed in the field but can be compromised during the reprogramming, and (3) a software programmable microprocessor plus software programmable FPGA which is easily reprogrammed but is difficult to secure from potential security attack or assure is a fail safe design in operation.

One can get the benefit of easy and inexpensive algorithm upgrades to existing products if one uses an FPGA that has a key embedded into the FPGA mask. Kean, U.S. Patent Publication 2001/0037458, filed Feb. 8, 2001 described such a system in which an FPGA with a secret key stored in the artwork of the FPGA was used to decrypt configuration data provided to the FPGA.

We propose an alternative device in which an FPGA core is embedded into an ASIC device. This embedded FPGA core can be programmed with new or updated cryptographic algorithms without the need to change any hardware. This provides cost and time advantages. The embedded FPGA core is protected by fixed logic in the ASIC. The fixed logic in the ASIC serves two purposes; first, monitor the FPGA is operating per its programming and in case of internal failures (Single or multiple point failures) the design will Fail safe tn knowne safe state. Second: the fixed logic is used to detect tampering attacks, and reverse engineering attacks are monitored by fixed logic monitor and processing circuits in the ASIC by use of established design techniques. By implementing this feature within the ASIC, future cryptographic algorithms can be supported without the need to rework the products in the field and yet still be assured the design will be safe. Also, by embedding the FPGA in an ASIC, the image file can be downloaded through a standard interface and an embedded processor state machine control can re-program the FPGA logic. The image can be transmitted in an encrypted form and be decrypted and authenticated before reprogramming the logic. The ability to achieve the high functionality and logic density of an ASIC while maintaining the capability to modify the logical function of a cryptographic processor provides a significant advantage and assures only the proper access is allowed to program the FPGA.

DETAILED DESCRIPTION OF AN EMBODIMENT

The design described below is just an example of the invention, which is not limited to the embodiment disclosed but instead incorporates the full scope of the patent claims.

This example design involves the use of an FPGA core along with memories, fault detectors, alarms, and support logic to handle keys, variable and constant storage, and arithmetic and data path manipulation functions. The flow of the algorithm is controlled by an algorithm image programmed in the FPGA core. This FPGA code can be securely loaded and cleared if needed to keep the algorithm details from being revealed. Significant external logic is added around the FPGA core to provide the ability to implement any of a number of cryptographic algorithms using the resource constrained FPGA core. The FPGA and external logic are architected to support many types of ciphers, including but not limited to, Stream Ciphers, Substitution-Permutation Network Ciphers, Feistel Ciphers, and any other Ciphers now known or developed in the future. An example dataflow for a Feistel Cipher is shown in FIG. 1, the source of which (and description following) was found at: http://en.wikipedia.org/wiki/Feistel.

Figure 1:
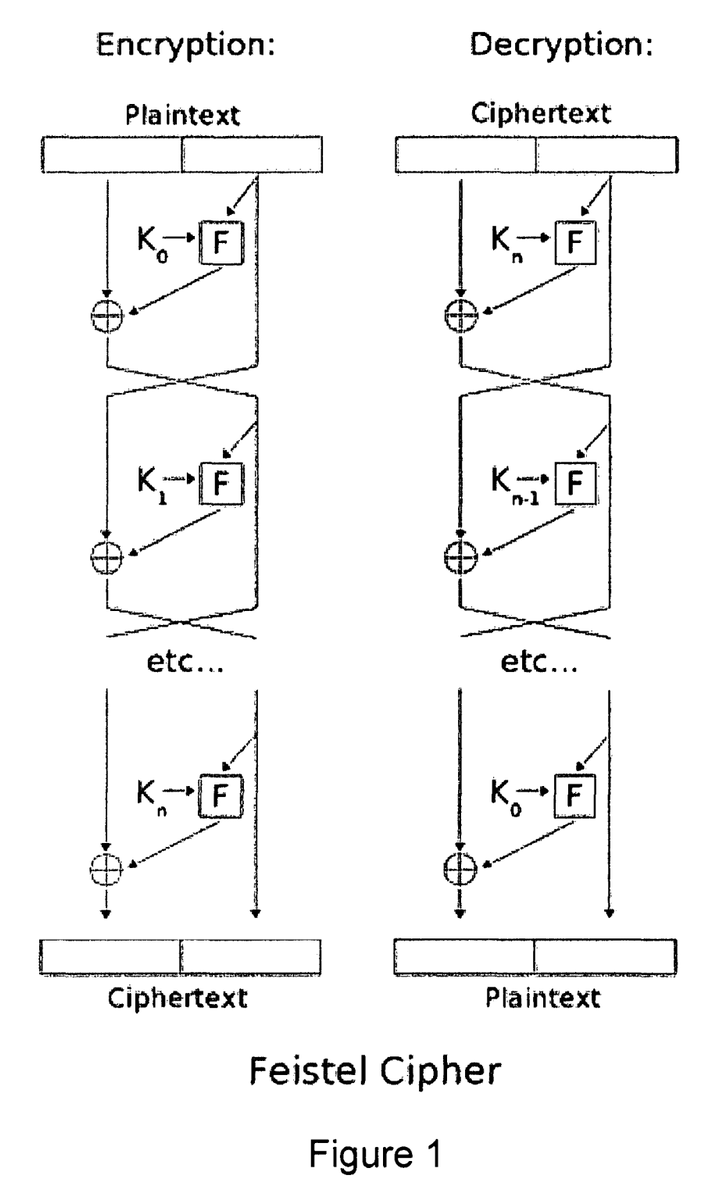
FIG. 1 is a prior art example data flow for a Feistel Cipher.

FIG. 1 illustrates both encryption and decryption in which F is the round function and $K_0, K_1, \ldots, K_n$ are the sub-keys for the rounds 0, 1, . . . n, respectively. The plaintext block is split into two equal pieces, $(L_0, R_0)$, and for each round i=0, 1, . . . , n, two equations, $L_{i+1}=R_i$ and $R_{i+1}=L_i \oplus F(R_i,K_i)$, are computed. The ciphertext becomes $(R_n,L_n)$. Commonly, the two pieces $R_n$ and $L_n$ are not switched after the last round. Decryption of a ciphertext $(R_n,L_n)$ is accomplished by computing for i=n, n−1, . . . , 0, two equations, $R_i=L_{i+1}$ and $L_i=R_{i+1} \oplus F(L_{i+1},K_i)$. $(L_0,R_0)$ is then the plaintext again.

Figure 2:
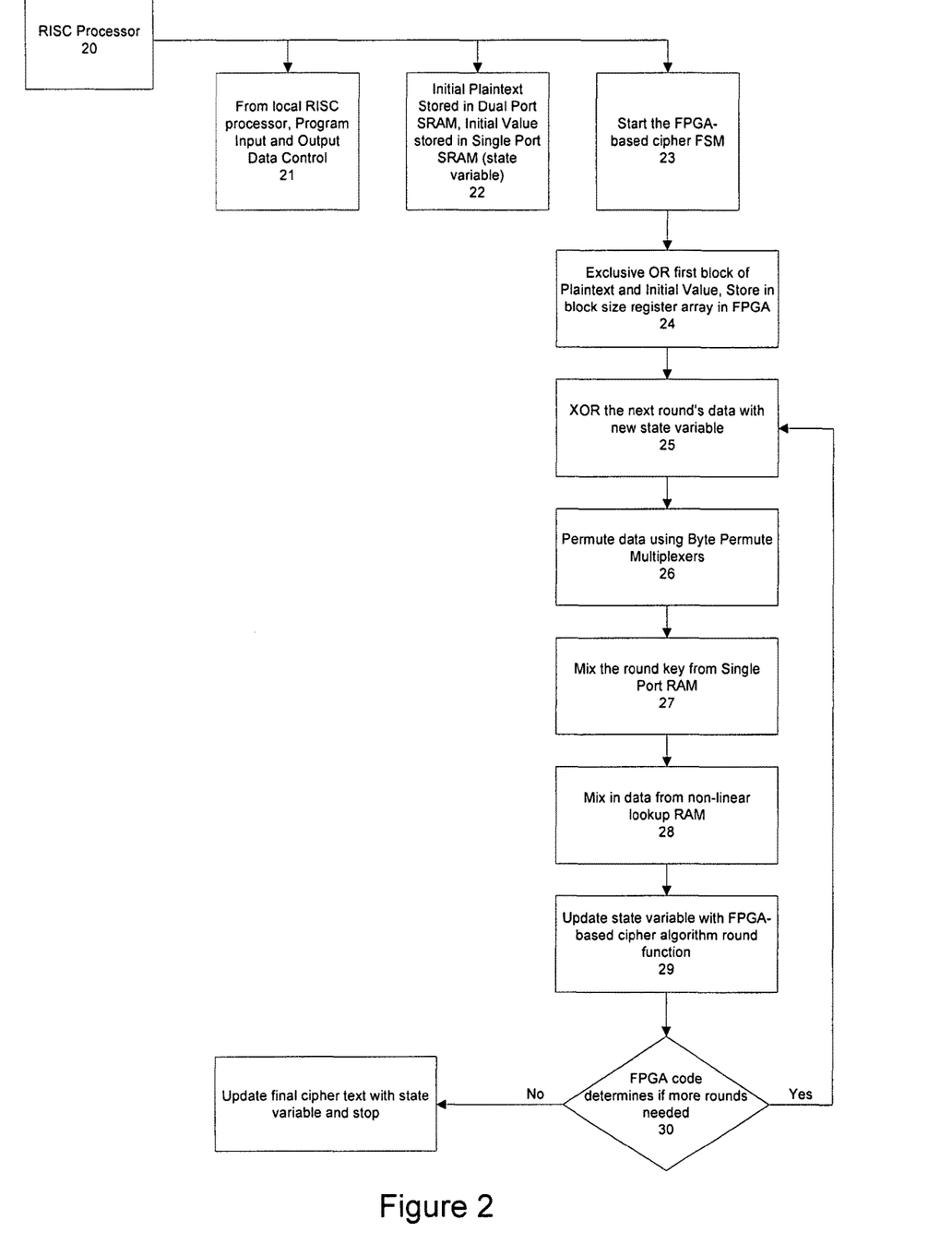
FIG. 2 is a flow chart of an example block cipher data flow for a Feistel Cipher.

An example of how the invention combines the control functions programmed into the FPGA with the external support of memories, arithmetic functions, data rotations, and non-linear transforms is shown in FIG. 2. In FIG. 2, RISC Processor 20 controls the program input and output data control at step 21, the storage of the plaintext and the initial value at step 22, and the initiation of the FPGA cipher function at step 23. After step 23, the first block of plaintext and the initial value stored in step 22 are input to an exclusive-OR, and the resultant stored in the block size register array in the FPGA, at step 24. The step is repeated with a next block, using a new initial value at step 25. The data is then permuted by byte permute multiplexers at step 26, the round key is mixed from the single port RAM at step 27, data from the non-linear lookup RAM is mixed at step 28. The state variable is then updated with the FPGA-based cipher algorithm round function at step 29.

If more rounds are needed at step 30, the routine routines to step 25 with another round of data and another new initial value. If not, the final cipher text is updated with the state variable and the process stops with the plain text having been ciphered.

Figure 3:
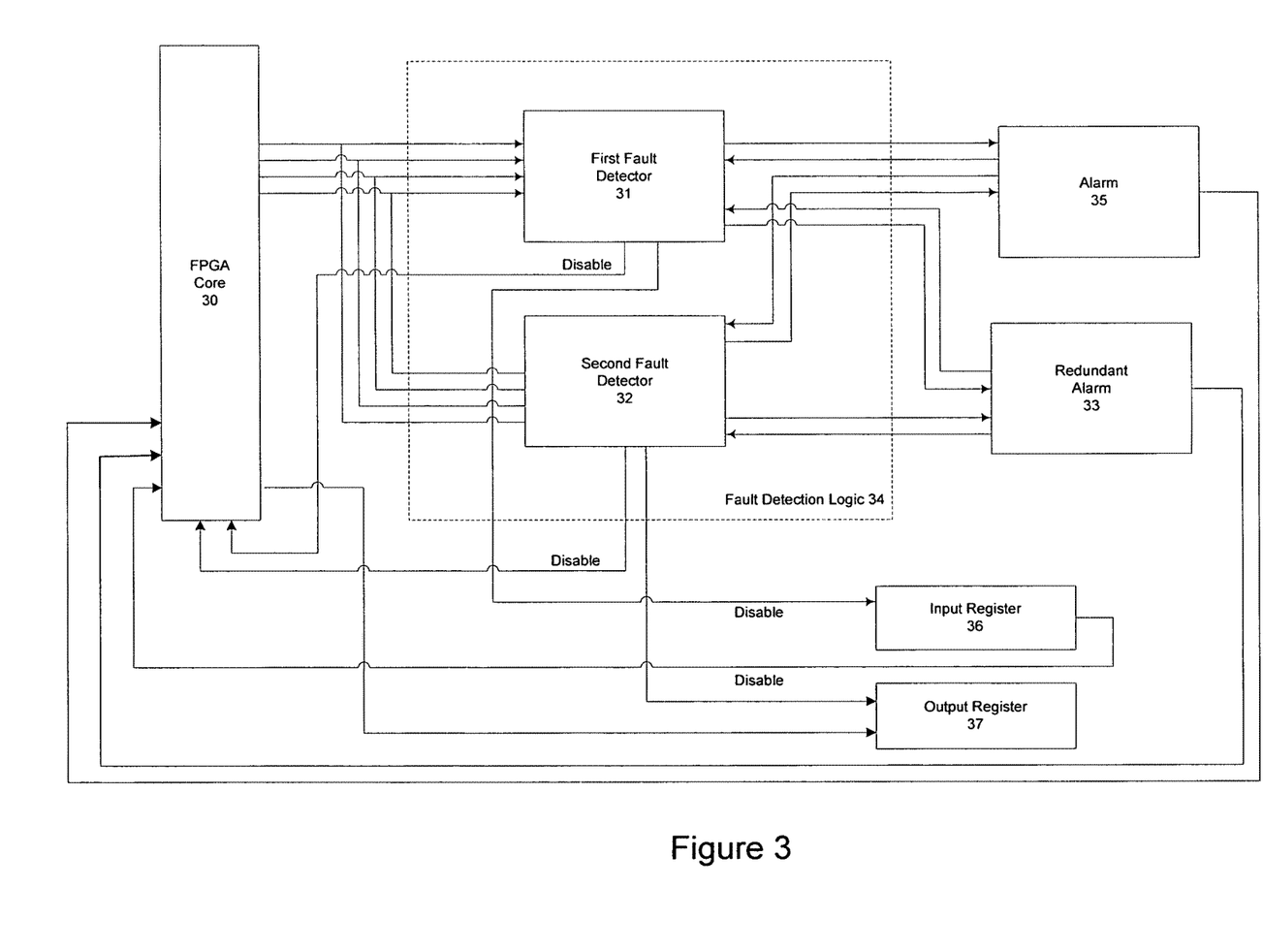
FIG. 3 is a block diagram of a cryptographic system.

FIG. 3 shows a block diagram of an example system. During encryption, data from the input register 36 in plaintext is ciphered and moved to the output register 37. FPGA core 30 operates between the input register 36 and output register 37 to encrypt the plaintext from the input register according to a programmed algorithm. First and second (redundant) fault detectors 31 and 32 are logic circuits that monitor the FPGA core 30 to detect tampering or failure in the core. The logic circuitry and methods of detection are known and can vary according to the fail safe design considerations. When either the first or second fault detectors perceives a problem (which may involve some threshold evaluation, such as a problem occurring repeatedly versus a one-time occurrence), the input register 36 and output register 37 are disabled, and redundant alarms 33 and 35 are activated.

In FIG. 3, the FPGA core 30 can be a standard FPGA core architecture that is embedded into a fixed logic device into which the first fault detector 31, second fault detector 32, redundant alarms 33 and 35, input register 35 and output register 37 are constructed. The FPGA core 30 is thus programmable to be able to alter, upgrade, or reprogram the cipher algorithm, but the registers, detection circuitry, and alarms are in fixed logic such as an ASIC (other options, such as state machines, are described below) so they are not affected by attacks or failures in the power supply, clock/frequency values, or programming steps of the processor core. With this design, if the FPGA goes down by either attack or failure, the fixed logic around it will still operate to produce the reset (failsafe) condition.

Figure 4:
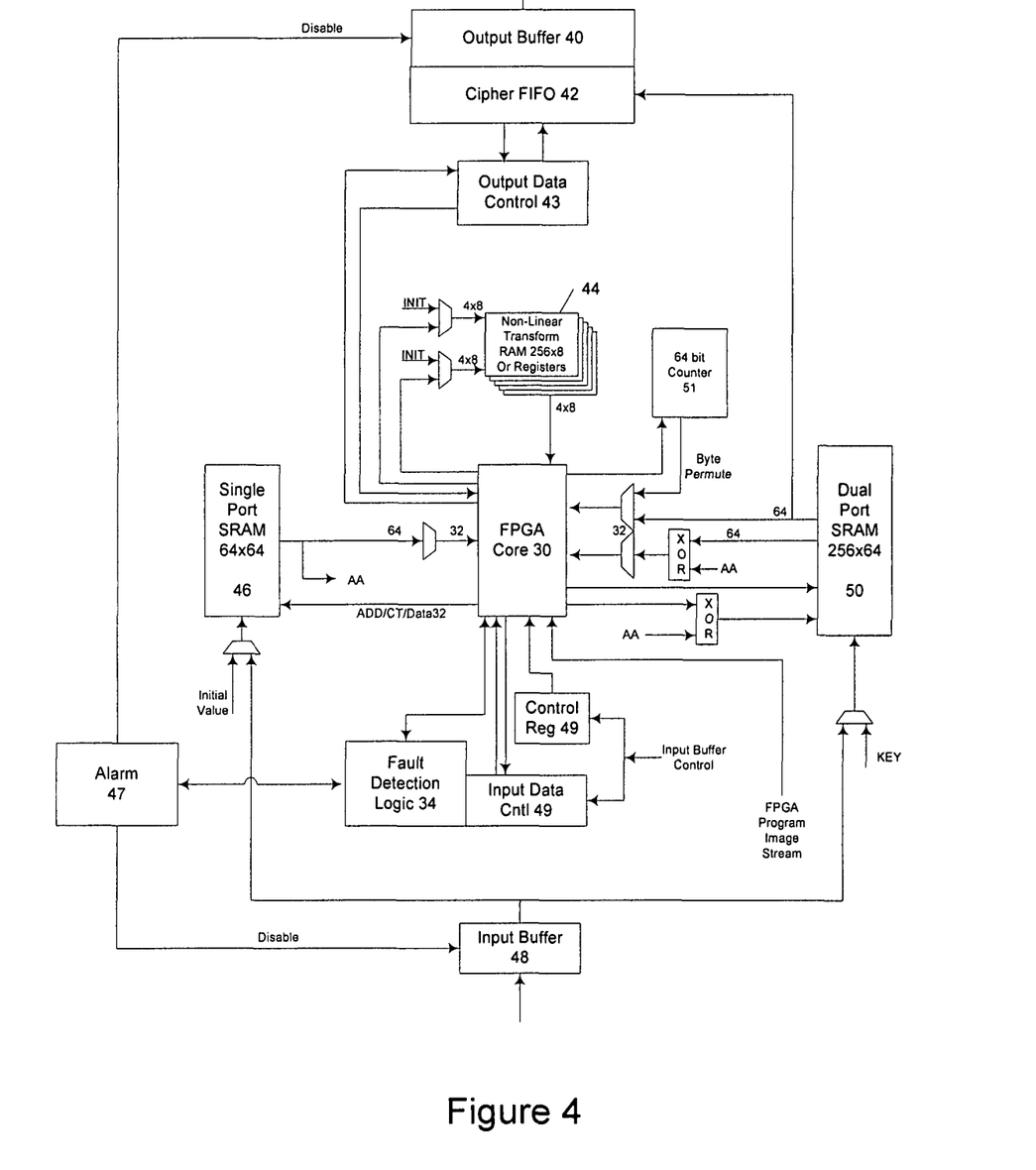
FIG. 4 is a block diagram of fault detection subsystems.

FIG. 4 shows another example system in more detail, in which the FPGA core 30 is again a standard programmable core, but all of the surrounding elements are in fixed logic.

In operation, the input and output control blocks 49 and 43 control data flow from the input buffer 48 to the output buffer 40. The input and output control blocks 49 and 43 may also manage clock domain crossing for data passing between different frequency clocks, if the FPGA logic is required to run at lower frequency than the ASIC logic. The control register 49 receives configuration information from a control processor to select cipher modes, key sizes, and other information. A two read port/two write port SRAM 50 is available to store the current cipher state and the expanded key value. A single port SRAM 46 is also implemented to provide storage for an Initial Value and a copy of the original key used for key expansion. A group of external 256 by 8 bit SRAMs 44 is connected to the FPGA to provide non-linear transform lookup table resources, especially useful for implementing S-Boxes often used in block ciphers. All RAMS are accessible simultaneously from dedicated ports on the FPGA core, giving improved processing speed. Exclusive OR logic is implemented externally to assist in the addition of variables such as present state, key value, and initial value. Multiplexers are implemented to assist in data steering and data byte permutations, as is counter 51. All of these operations are common to cryptographic algorithms and are known to consume significant amounts of programmable logic resources within an FPGA block.

The FPGA Program image is generated using standard FPGA programming methods, with the source code written to take advantage of the external resources available to the FPGA block. The FPGA Program Image can be encrypted so that the function of the cipher cannot be deduced, and authenticated to assure that the programming image has been generated by an approved source. The FPGA must be initialized by this decrypted and authenticated FPGA Program Image following the de-assertion of the ASIC system reset, and before any functionality is required from the FPGA cipher.

FIG. 4, the redundant fault detection circuitry as in FIG. 3 is shown as fault detection logic 34. The redundant alarms are shown as alarm 47. As shown in FIG. 3, these monitor (fault detectors, alarms) circuits detect anomaly behavior from the FPGA core 30. In the design of the FPGA core, four outputs (minimum, by example, shown in FIG. 3) are used to input to the fault detection logic 31/32/34. If the FPGA design is not operating per its intended design parameters, the four outputs from the FPGA core will signal a fault condition to the fault detector. In turn, the fault detector 31/32/34 will send a signal to the alarm logic 33/35/47 that an alarm condition has occurred. The input and output registers 36/37/48/40 and the FPGA core 30 will be disabled, i.e., fail-safe. The four outputs from the FPGA are logical function monitoring functions of the cryptographic algorithms selected as "heart beat" of the design where, if the design is malfunctioning, the outputs will be incorrect.

In keeping a fail safe design, the output from the fault detection and alarm logic will be redundant (no single failure point), as shown in FIG. 3. The basic design is full redundant implementation where any failure in the fault detection or alarm circuit will signal a fail state and the design will fail to a fail safe state, meaning any state where the functional aspect of the logic is not operating or fails to know state considered as a defined state for the host system or application.

There are two example methods for implementing the failure detection. In the first example, the failure detection is implemented in traditional logic design using either state machines or fixed logic. In the second, it is implemented in self-checking logic or state machine design techniques. Self-checking logic is a class of design using redundant design techniques to ensure functionality but also fault detection. The fault detection detectors are redundant designs, but can be implemented either as exact copied designs or by different, functional equivalent designs. If one of the fault detectors fails to a fail safe state, the alarm logic will detect and disable the in/out registers and FPGA, and set the alarm flags. The alarm or fault detection circuit can be reset but if the error persists, the logic will fail safe.

Thus, in FIG. 4, the FPGA core 30 is programmable to load, update, or reprogram the algorithm conveniently in the field. A key programmed in fixed logic can also be used to decrypt the updated algorithm to make the transfer of the updated algorithm to the FPGA secure. Many security problems associated with current programmable encryption devices are thus eliminated by constructing the surrounding architecture in traditional or self-checking fixed logic or state devices. Preferably, though not exclusively, each of the elements shown in FIG. 4 are constructed in an ASIC except the FPGA core 30, which is embedded within the ASIC construction. Constructing some number less than all of the non-core elements is less preferred though also envisioned to provide some security advantage.

This programmable cryptographic ASIC design can be applied to any software programmable cryptographic application. It has application in secure I/O products; wireless communication products such as cell phones and mobile radios; IP communication products such as routers, NICs, and servers; data storage; mesh network radios; VoIP product, SCADA devices and any other secure communication environment now known or discovered in the future.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

Figure 5:
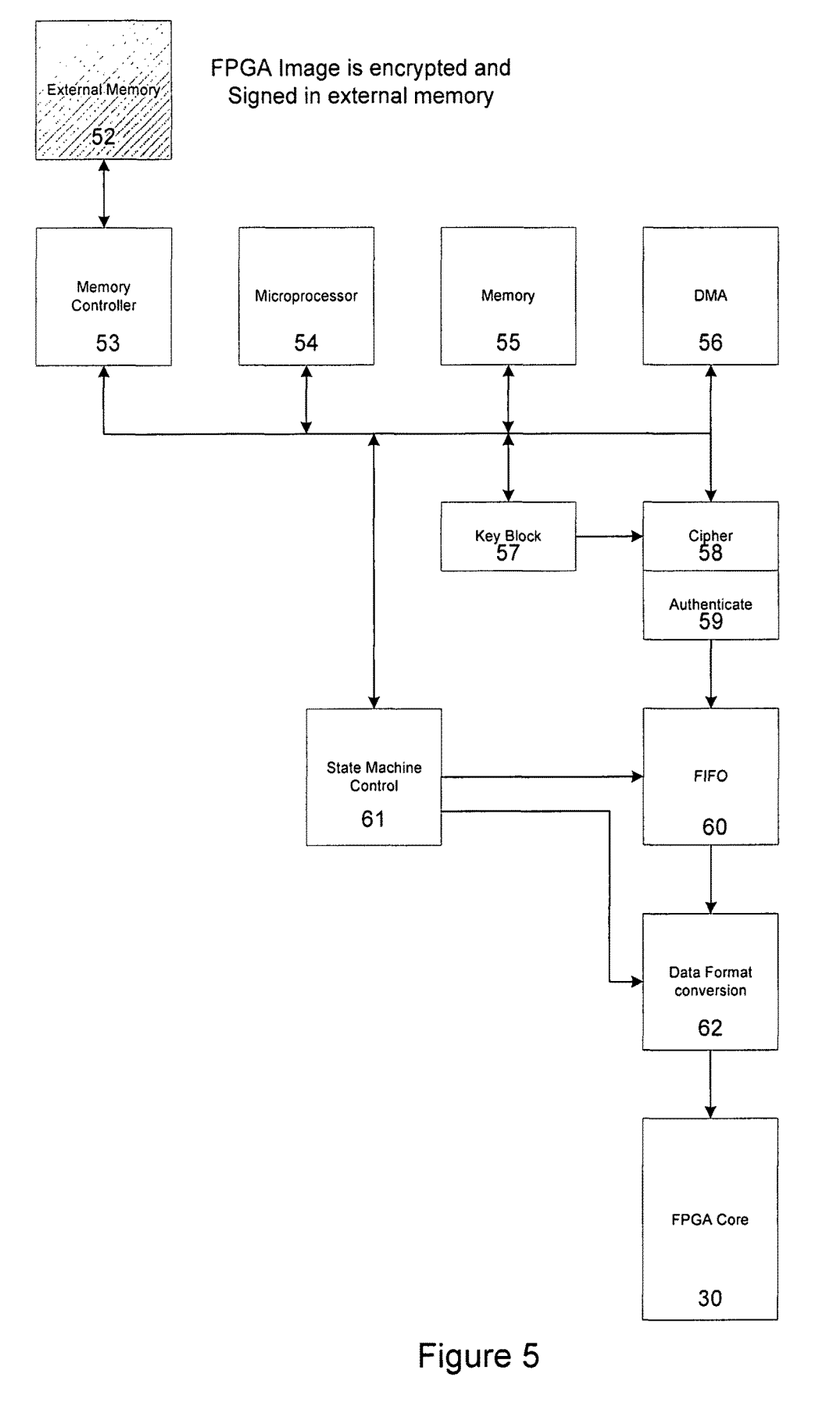
FIG. 5 is a block diagram of the system for secure loading of the FPGA image.

FIG. 5 shows the system for securely loading the FPGA Program Image. This Program Image is a custom binary image generated by the FPGA vendor programming tool, and is based on the custom algorithm programmed by the designer.

The Program Image is processed through a one way hash algorithm to create a unique signature. The hash algorithm is chosen to be one that is available within the FPGA secure loading system, through authentication block 59, in FIG. 5. The signature is appended to the Program image.

The Program Image is further processed to encrypt the image which has the signature appended, using a cipher algorithm chosen to be available within the FPGA secure loading system in FIG. 5. The cipher 58 uses a key which is generated and stored within the Key Block 57. This key is a shared secret between the program and the system.

The signed and encrypted Program Image is placed into a memory external to the system. This can be unique for each system or shared for a family of products.

The FPGA is securely loaded as part of system initialization immediately following the release of reset. The system is secure in this mode, with no inputs or outputs enabled and only the microprocessor 54 acting as a control agent. The software running on the microprocessor 54 begins by enabling the Memory Controller 53 and then directly reading the data from the external memory 52 and writing the data to the cipher 58 and authentication 59 blocks. This data transfer may also be accomplished by using the Direct Memory Access (DMA 56) to transfer the data, under the control of the software running on the microprocessor. The decrypted Program Image is output to the FIFO 60 for temporary storage. The FIFO 60 functions as a temporary buffer to hold the decrypted data before the data is programmed into the FPGA core. The State Machine Control 61 is initialized by configuration writes by the software running on Microprocessor 54 to detect that a portion of the Program Language Stream is available in the FIFO 60. The State Machine Control 61 then controls the Data Format Conversion 62 to finally program the FPGA Core 30 with the Program Image.

The software running on Microprocessor 54 will read a status bit in the Control State Machine 61 to determine that the FPGA program has completed. The software running on Microprocessor 54 will then read the result from the Authentication unit 59 to determine if the authentication of the Program Image was successful. If not successful, the software running on Microprocessor 54 will write a command to the Control State Machine 61 to cause the Control State Machine 61 to overwrite the FPGA Program image with a constant value, effectively erasing the image, and then report a system error. If the authentication was successful, the FPGA can be enabled in the system, and the system initialization can continue.

Figure 6:
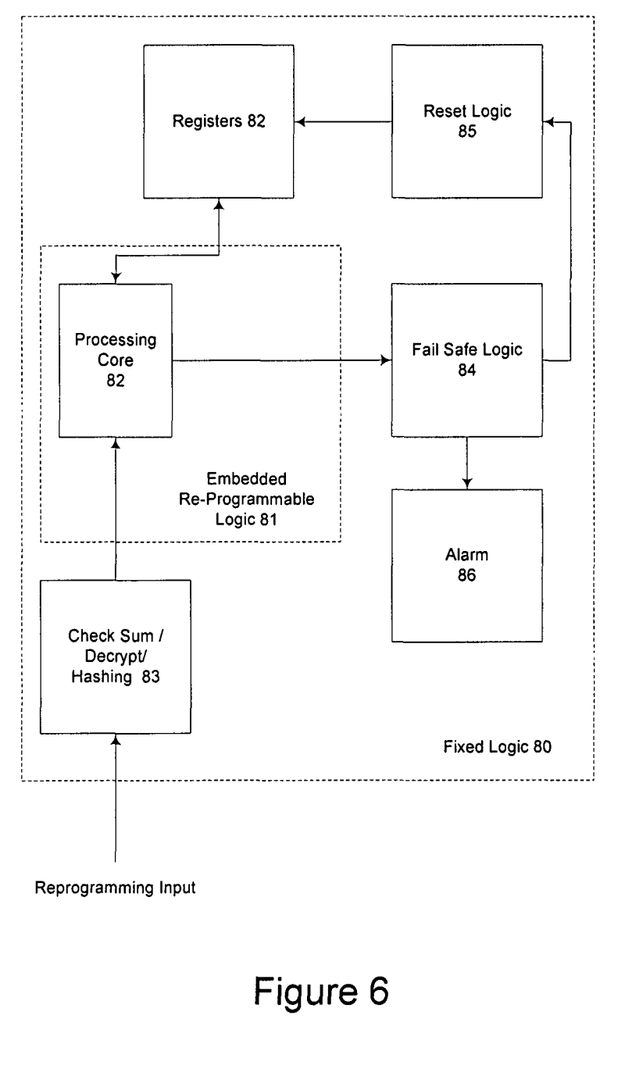
FIG. 6 is a block diagram of a cryptographic system.

FIG. 6 shows a high-level block diagram of an example cryptographic system in which embedded reprogrammable logic 81, including a processing core 82, is embedded into a fixed logic 80 section. All other logic devices in the system, including registers 82, checksum/decrypt/hashing verification section 83 (receiving reprogramming instructions from an external source), fail safe logic 84, reset logic 85, and alarm 86, are produced in the fixed logic 80. The processing core 82 in FIG. 6 may be an FPGA or any other reprogrammable processing device. The registers 82 may include an input register, an output register, a key register, and other registers. Reset logic 85 may operate as described earlier to reset the registers after fault detection. Fail safe logic 84 can be any type of sniffing function that monitors secure operation of the core 82. Alarm 86 can include disabling logic to disable the core 82 and/or the registers 82 upon fault detection.

The invention claimed is:
1. A programmable encryption device for encrypting plain data into ciphered data, comprising:
    a fixed logic device including:
        an input register for receiving the plain data;
        an output register for delivering the ciphered data;
        fault detection logic to test a field programmable core during run-time to determine a fault condition and fail safe to a known safe state; and
        configured to internally authenticate inside the fixed logic, and outside of an FPGA, loading of programming to the field programmable core in the FPGA; and
    the field programmable core embedded into the fixed logic device between the input register and the output register for storing and executing an encryption algorithm on the plaintext.

2. A device according to claim 1, wherein:
the input register and output register are included in an ASIC.

3. A device according to claim 1, wherein:
the field programmable core is an FPGA core.

4. A device according to claim 1, wherein:
the fault detection logic monitors the field programmable core to determine a fault condition and fail safe to a known safe state.

5. A device according to claim 1, wherein:
the fixed logic device further includes:
redundant fault detection logic to test the field programmable core to determine a fault condition.

6. A device according to claim 4, wherein:
the fixed logic device further includes:
an alarm circuit to indicate the fault condition.

7. A device according to claim 5, wherein:
the fixed logic device further includes:
redundant alarms to indicate the fault condition.

8. A device according to claim 1, wherein:
the fixed logic device further includes:
random access memory or registers to store a key and an initial value for use in executing the encryption algorithm.

9. A device according to claim 1, wherein:
the fixed logic device further includes:
data control logic to control the input and output registers.

10. A device according to claim 1, wherein the field programmable core embedded into the fixed logic device only contains the encryption algorithm.

11. A programmable encryption device, comprising:
a fixed logic device including fail safe logic and configured to internally authenticate inside the fixed logic, outside of an FPGA, loading of programming to a field programmable core in the FPGA; and
the field programmable core embedded into the fixed logic device between an input register and an output register for storing and executing an encryption algorithm, the fail safe logic to test the field programmable core during run-time to determine a fault condition and disable the device when the fault condition is detected.

12. A device according to claim 11, wherein:
the fail safe logic is in an ASIC.

13. A device according to claim 11, wherein:
the field programmable core is an FPGA core.

14. A device according to claim 11, wherein:
the fixed logic device further includes:
an input register for receiving plain data and an output register for delivering ciphered data.

15. A device according to claim 11, wherein:
the fail safe logic includes:
redundant fault detection logic to test the field programmable core to determine the fault condition.

16. A device according to claim 11, wherein:
the fail safe logic includes:
redundant alarms to indicate an occurrence of the fault condition.

17. A device according to claim 11, wherein:
the fixed logic device further includes:
random access memory or registers to store a key and an initial value for use in executing the encryption algorithm.

18. A device according to claim 14, wherein:
the fixed logic device further includes:
data control logic to control the input and output registers.

19. A device according to claim 11, wherein the field programmable core embedded into the fixed logic device only contains the encryption algorithm.

20. A method, comprising:
receiving plain text into an input register constructed in a non-programmable, fixed logic device;
authenticating, by the non-programmable, fixed logic device, programming to be loaded into a field-programmable logic device, wherein the non-programmable, fixed logic device authenticates the programming outside of the field-programmable logic device;
ciphering the plain text into ciphered text using the field-programmable logic device embedded into the non-programmable, fixed logic device between the input register and an output register; and using an encryption algorithm stored in the field-programmable logic device; and
delivering the ciphered text into the output register constructed in the non-programmable, fixed logic device.

21. A method according to claim 20, further:
testing, in a non-programmable, fixed logic fail safe circuit, the field-programmable logic device substantially as the field programmable logic device is ciphering the plain text.

22. A method according to claim 21, further:
using the fail safe circuit to disable the input register and output register when the testing determines a failure condition.

23. A method according to claim 20, further including:
reprogramming the field programmable logic device with a new encryption algorithm and then repeating the receiving, ciphering, and delivering steps using the new encryption algorithm.

* * * * *